(12) United States Patent
Takahashi

(10) Patent No.: US 8,943,246 B2
(45) Date of Patent: Jan. 27, 2015

(54) CHARACTER INPUT DEVICE, CHARACTER INPUT INTERFACE CONTROL METHOD, AND PROGRAM

(71) Applicant: NEC Casio Mobile Communications, Ltd., Kawasaki-shi, Kanagawa (JP)

(72) Inventor: Naomichi Takahashi, Kanagawa (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 0 days.

(21) Appl. No.: 13/738,336

(22) Filed: Jan. 10, 2013

(65) Prior Publication Data

US 2014/0194186 A1    Jul. 10, 2014

(51) Int. Cl.
*G06F 3/023* (2006.01)
*A63F 13/00* (2014.01)

(52) U.S. Cl.
CPC .......................................... *A63F 13/00* (2013.01)
USPC ................. 710/67; 345/169; 341/22; 341/23; 341/29

(58) Field of Classification Search
USPC ................................ 463/23; 345/169; 710/67
See application file for complete search history.

(56) References Cited

U.S. PATENT DOCUMENTS

| 4,364,299 | A  | * | 12/1982 | Nakada et al. | 84/478 |
| 6,396,482 | B1 | * | 5/2002 | Griffin et al. | 345/169 |
| 6,744,422 | B1 | * | 6/2004 | Schillings et al. | 345/169 |
| 7,382,359 | B2 | * | 6/2008 | Griffin | 345/169 |
| 7,774,524 | B2 | * | 8/2010 | Burstrom | 710/67 |

FOREIGN PATENT DOCUMENTS

| JP | 2009-289178 A | 12/2009 |
| JP | 2010-15439 A | 1/2010 |

* cited by examiner

*Primary Examiner* — Tramar Harper
(74) *Attorney, Agent, or Firm* — Sughrue Mion, PLLC

(57) ABSTRACT

A character input device of the present invention includes a skill estimation unit that estimates the skill of a user in character input operation, based on the history of key operation by the user. In this character input device, a determination period for determining an input character being selected by a character input interface unit is increased or decreased, according to the skill estimated by the skill estimation unit. The character input interface unit selects the character based on the number of times at which a same key has been depressed, and judges whether or not the determination operation of the character has been performed, based on the determination period.

20 Claims, 10 Drawing Sheets

FIG. 3

| AVERAGE KEY INPUT TIME | ESTIMATED SKILL | DETERMINATION PERIOD |
|---|---|---|
| $k =< SH\_H$ | HIGH | $T_{short}$ |
| $SH\_H < k < SH\_L$ | STANDARD | $T_{std}$ |
| $SH\_L <= k$ | LOW | $T_{long}$ |

FIG. 9

| AVERAGE KEY INPUT TIME | ESTIMATED SKILL | DETERMINATION PERIOD CORRECTION AMOUNT |
|---|---|---|
| k =< SH_H | HIGH | -α |
| SH_H < k < SH_L | STANDARD | 0 |
| SH_L <= k | LOW | +α |

CHARACTER INPUT DEVICE, CHARACTER INPUT INTERFACE CONTROL METHOD, AND PROGRAM

TECHNICAL FIELD

Reference to earlier application. The present invention was first applied as Japanese patent application No. P2010-251824 on Nov. 10, 2010 which was published as Japanese Patent Kokai Publication No. P2012-103903A on May 31, 2012. The entire disclosure thereof being incorporated herein by reference thereto.

The present invention relates to a character input device, a character input interface control method, and a program. More specifically, the invention relates to a character input device including a character input interface unit that selects an input character according to the number of times at which a same key has been depressed, a character input interface control method, and a program.

BACKGROUND

Patent Literature 1 discloses an input device including a character input interface unit that performs switching among a plurality of characters assigned to a same key, according to the number of times at which the key has been depressed. This input device has a function of judging that the determination operation of one of the assigned characters being currently displayed has been performed when no key input is made for a given period of time and then causing a cursor to move to an adjacent position. By utilizing this function, a key operation for moving the cursor, which also serves as the determination operation of the character, can be omitted during input of the character.

Patent Literature 2 discloses an information input device that automatically selects a function of executing a subsequent operation, in response to a result of measurement of a speed at which information to be input has been input. Specifically, as shown in FIG. 6 of Patent Literature 2, according to the speed at which a character has been input, subsequent display of content such as the meaning of the input character or selection of a dictionary for use is proposed.

Patent Literature 1

JP Patent Kokai Publication No. JP-2009-289178A

Patent Literature 2

JP Patent Kokai Publication No. JP-2010-15439A

SUMMARY

The following analysis has been given by the present disclosure.

There is, however, a problem that, when the function described in Patent Literature 1 (hereinafter referred to as an "automatic cursor transfer function") is enabled, this function becomes an inconvenient function to the contrary for a user who needs much time to perform character input operation. Assume a case where a "1" key assigned to the "a" column of the kana syllabary is depressed three times to select a Japanese character "u", for example. Then, when a determination period (denoted by Tf in FIG. 10) has elapsed after first depression of the "1" key before second depression of the "1" key, it is considered that the determination operation of a Japanese character "a" has been performed. The cursor is therefore moved. When third depression of the "1" key is also delayed, Japanese characters "aaa" are input, as shown in FIG. 10.

On the contrary, when the determination period (denoted by Tf in FIG. 10) is increased to suit the user who needs much time to perform a character input operation, a user who is quick in character input operation feels that he must wait for a long time for determination of a character, thereby feeling stressed.

Under such a situation, among cellular phones, there is a cellular phone in which a user can selectively set the determination period to be OFF/slow/standard/fast, using a menu. It often happens, however, that the user cannot find out the setting menu, and then uses the cellular phone without being able to change the setting.

Thus there is a need in the art to provide a character input device including a character input interface unit, a character input interface control method, and a program where the number of times of key depressions can be contributed to reduce for both of a user having a high skill in character input operation and a user having a low skill in the character input operation. The program may be stored in a non-transitory computer-readable medium.

According to a first aspect, there is provided a character input device comprising:

a skill estimation unit that estimates a skill of a user in character input operation, based on a history of key operation by the user; and a character input interface unit that selects an input character based on a number of times at which a same key has been depressed; wherein a determination period for determining the character being selected is increased or decreased according to the skill estimated by the skill estimation unit, the determination period being used by the character input interface unit to judge whether or not a determination operation of the character has been performed.

According to a second aspect, there is a character input interface control method comprising:

estimating a skill of a user in character input operation, based on a history of key operation by the user; and increasing or decreasing a determination period for determining an input character being selected by a character input interface unit according to the skill estimated by the skill estimation unit, the character input interface unit selecting the character based on a number of times at which a same key has been depressed and judging whether or not a determination operation of the character has been performed, based on the determination period. This method is linked to a specific machine, which is the character input device including the character input interface unit that selects the input character according to the number of times at which the same key has been depressed.

According to a third aspect, there is provided a program for causing a computer installed in a character input device to execute the processes of:

estimating a skill of a user in character input operation, based on a history of key operation by the user; and increasing or decreasing a determination period for determining an input character being selected by a character input interface unit according to the skill estimated by the skill estimation unit, the character input interface unit selecting the character based on a number of times at which a same key has been depressed and judging whether or not a determination operation of the character has been performed, based on the determination period. This program can be recorded in a computer readable recording medium. That is, the present invention can also be embodied as a computer program product.

The meritorious effects of the present disclosure are summarized as follows.

According to the present disclosure, the character input interface unit is made easy to use for both of a user having a high skill in character input operation and a user having a low skill in character input operation. The character input interface unit selects an input character according to the number of times at which a same key has been depressed, judges that the determination operation of the character being selected has been performed due to interruption of key input, and performs a process.

BRIEF DESCRIPTION OF THE DRAWINGS

FIG. 3 is a table showing correspondence relationships between estimated skills and determination periods established by the character input device in the first exemplary embodiment of the present disclosure;

FIG. 9 is a table showing correspondence relationships between estimated skills and correction amounts of determination periods established by a character input device in a second exemplary embodiment.

PREFERRED MODES

First, an overview of the present disclosure of will be described. The present disclosure can be implemented by an information processing device including a character input interface unit that selects an input character according to the number of times of depressions of a key to which a plurality of characters are assigned. The information processing device includes a function of judging that the input character is determined when a predetermined determination period has elapsed after selection of the input character by depression of the key.

Figure 1:
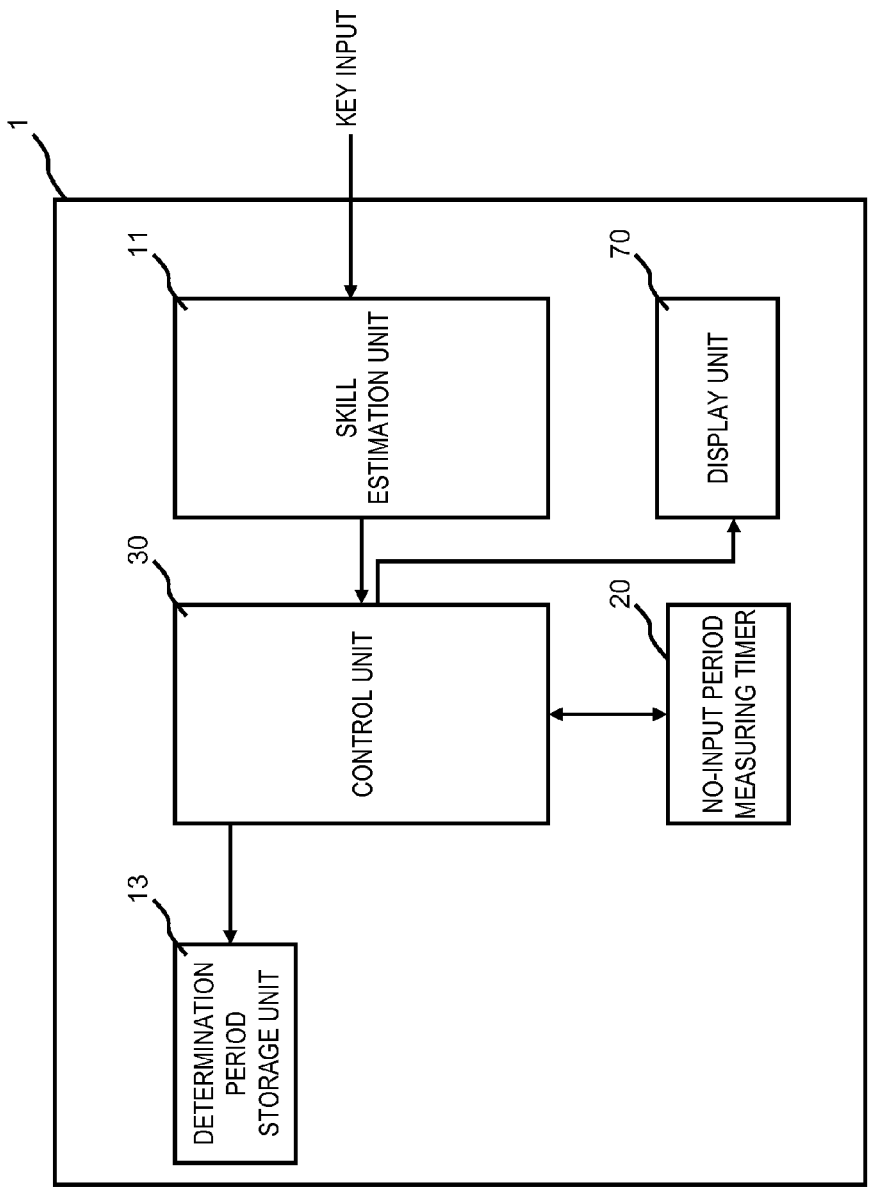
FIG. 1 is a diagram for explaining an overview of the present disclosure.

More specifically, as shown in FIG. 1, the information processing device can be set to a configuration including a skill estimation unit 11 that estimates the skill of a user in character input operation based on the history of key operation by the user, and a control unit 30 that increases or decreases a determination period stored in a determination period storage unit 13, according to the skill estimated by the skill estimation unit 13. A reference symbol in the drawing appended to this overview is appended to each element for the sake of convenience, as an example for helping understanding of the disclosure, and does not intend to limit the present disclosure to the mode illustrated in the drawing. As the history of the key operation by the user, the number of times of key operations per hour, a period of time needed to input the predetermined number of characters, the number of times of correction key depressions per hour, or the like may be arbitrarily employed.

Figure 10:
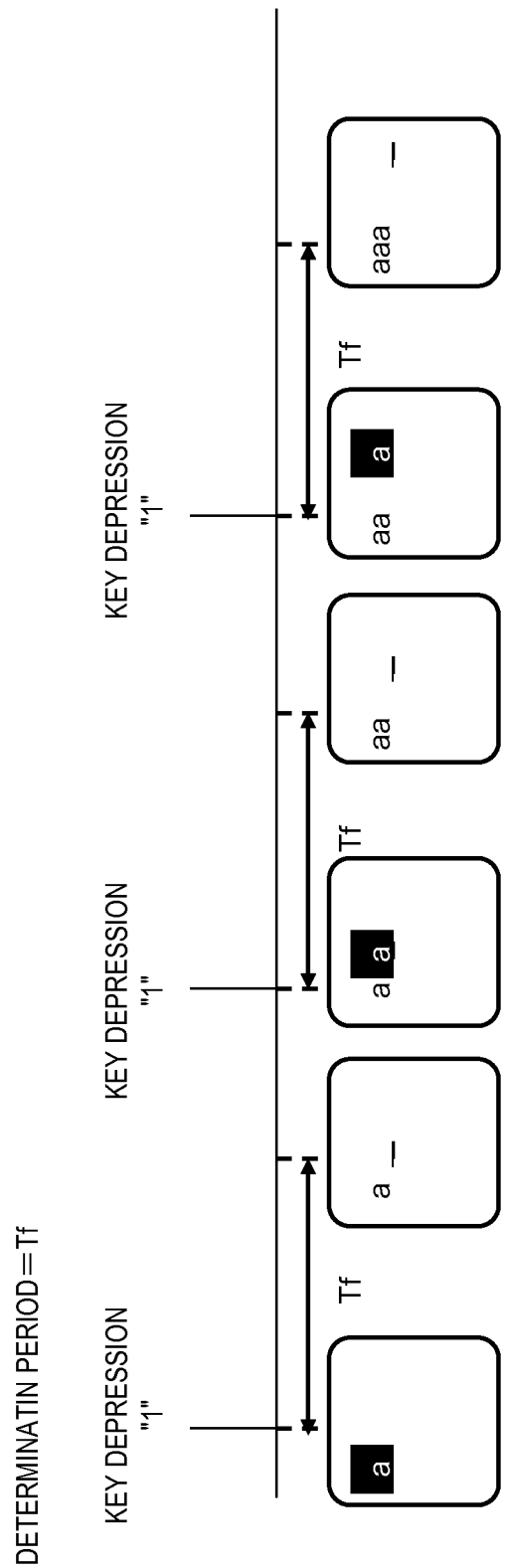
FIG. 10 is a diagram for explaining input content when a determination period is short with respect to the key depression speed of a user.

By adopting the configuration as described above, a longish determination period can be set for a user having a low skill in character input operation. Determination of a character unintended for the user as shown in FIG. 10 can be thereby prevented.

First Exemplary Embodiment

Figure 2:
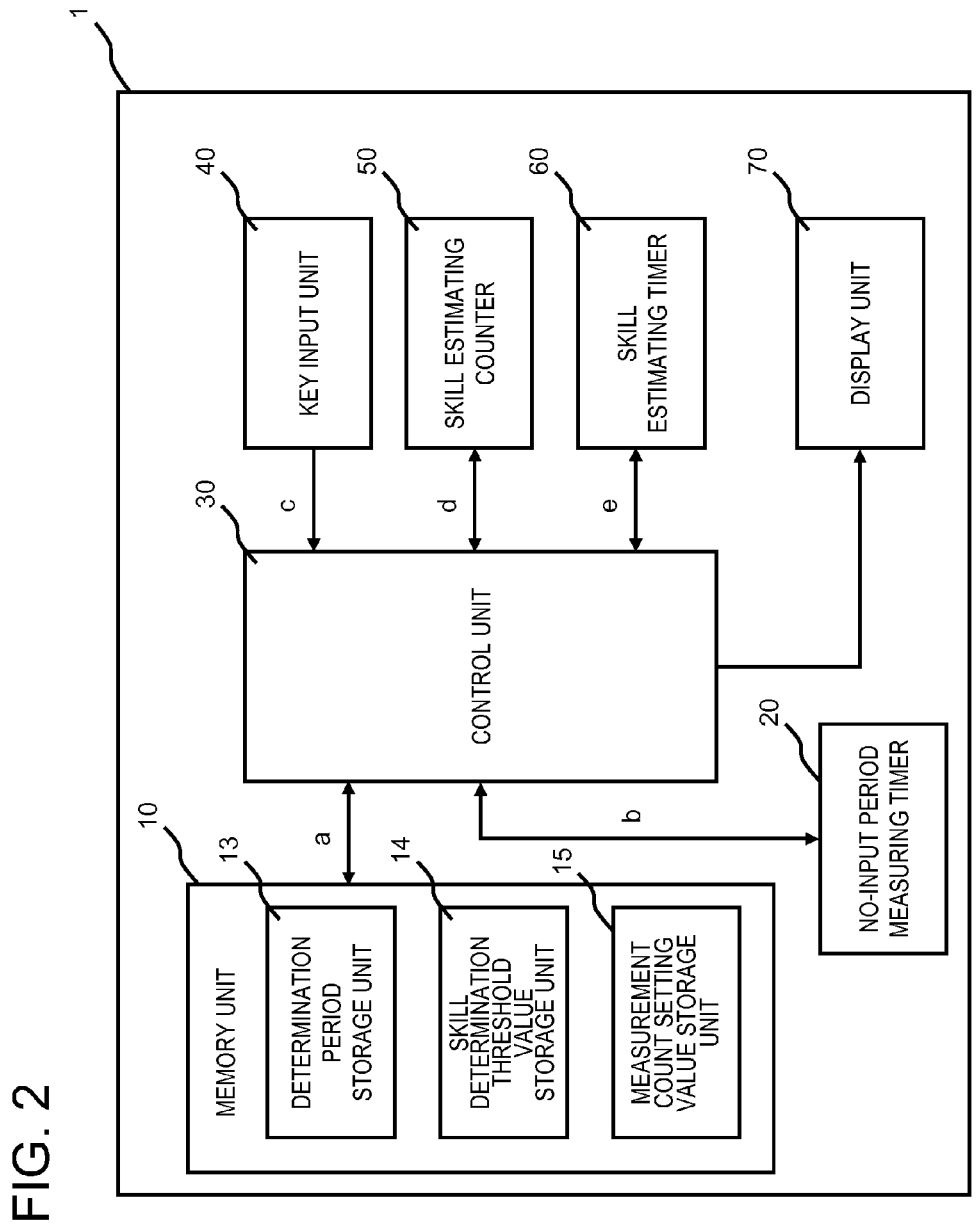
FIG. 2 is a block diagram showing a configuration of a character input device in a first exemplary embodiment of the present disclosure.

Next, a first exemplary embodiment of the present disclosure will be described in detail with reference to drawings. FIG. 2 is a block diagram showing a configuration of a character input device 1 in the first exemplary embodiment of the present disclosure. As the character input device 1, various portable terminals typified by cellular phones, and various embedded devices each including a character input interface unit such as printers, facsimile devices, and information appliances are also included.

Referring to FIG. 2, there is shown the configuration including a memory unit 10, a no-input period measuring timer 20, a control unit 30, a key input unit 40 that detects key input by a user, a skill estimating counter 50 that counts the number of times of key depressions or the number of input characters, a skill estimating timer 60 that measures a period of time needed for input of the predetermined number of times of key operations or the predetermined number of characters, and a display unit 70 that displays an input character. The skill estimating counter 50, the skill estimating timer 60, and the skill estimation function of the control unit 30 correspond to the skill estimation unit mentioned above.

The memory unit 10 includes a determination period storage unit 13, a skill determination threshold value storage unit 14, and a measurement count setting value storage unit 15. The determination period storage unit 13 stores a determination period for judging whether or not the determination operation of a character being selected by the character input interface unit has been performed. The character input interface unit selects an input character according to the number of times of depressions of a same key.

When a key input signal c indicating input key information is supplied to the control unit 30 from the key input unit 40, the control unit 30 updates content displayed on the display unit 70, and also resets the no-input period measuring timer 20 to operate by a timer control signal b. The control unit 30 compares a value indicated by the no-input period measuring timer 20 and the determination period held in the determination period storage unit 13 read by using a memory unit access signal a. When the determination period has elapsed, the control unit 30 performs the determination process of a character being selected (for which the determination process has not been finished) on the display unit 70.

Further, when a predetermined skill estimation start condition is established, such as at a time of dial input in a standby state, the control unit 30 causes the skill estimating timer 60 to operate by a timer control signal e. The control unit 30 causes the skill estimating counter 50 to be incremented by a counter control signal d whenever the key input signal c is input, and then measures a measured time t until the value of the skill estimating counter 50 assumes a measurement count setting value n set in the measurement count setting value storage unit 15. The control unit 30 compares an average key input time k (=t/n) obtained by the measured time t with a threshold value stored in the skill determination threshold value storage unit 14 to perform a process of increasing or decreasing the determination period stored in the determination period storage unit 13.

FIG. 3 is a table showing correspondence relationships between estimated skills each estimated according to the computed average key input time k and determination periods.

In the example in FIG. 3, each determination period is selected according to a high-speed side threshold value SH_H and a low-speed side threshold value SH_L held in the skill determination threshold value storage unit 14. The high-speed side threshold value SH_H is a threshold value for a user who is quick in key input, and the low-speed side threshold value SH_L is a threshold value for a user who is slow in the key input.

When the average key input time k is equal to or less than the high-speed side threshold value SH_H, the control unit 30 determines that the speed of key input is quick, and then sets a short value $T_{short}$ to the determination period. When the average key input time k is equal to or larger than the low-speed side threshold value SH_L, the control unit 30 determines that the speed of key input is slow, and then sets a long value $T_{long}$ to the determination period. When the average key input time k is larger than the high-speed side threshold value SH_H but is less than the low-speed side threshold value SH_L, the control unit 30 sets a standard value $T_{std}$ to the determination period.

By performing the settings as described above, the determination period suited to the key input speed of a user is applied.

Each unit (processing means) of the character input device 1 shown in FIG. 2 can also be implemented by a computer program for causing a computer constituting the character input device 1 to execute each of the processes described above, using hardware of the computer.

Next, operation of this exemplary embodiment will be described in detail with reference to drawings. First, measurement of the measured time k using the skill estimating counter 50 and the skill estimating timer 60 will be described, with reference to FIGS. 4 to 6. The following description will be given, assuming that the measurement count setting value n of three is set in the measurement count setting value storage unit 15.

Figure 4:
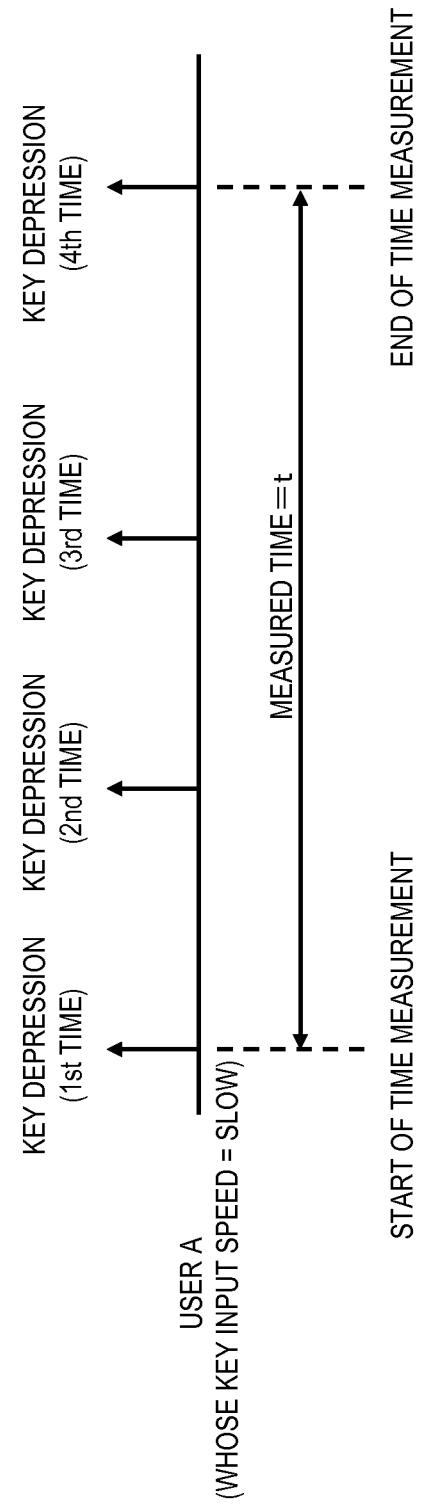
FIG. 4 is a diagram for explaining a process of estimating a skill according to the key input speed (when the key input speed is slow)
Figure 5:
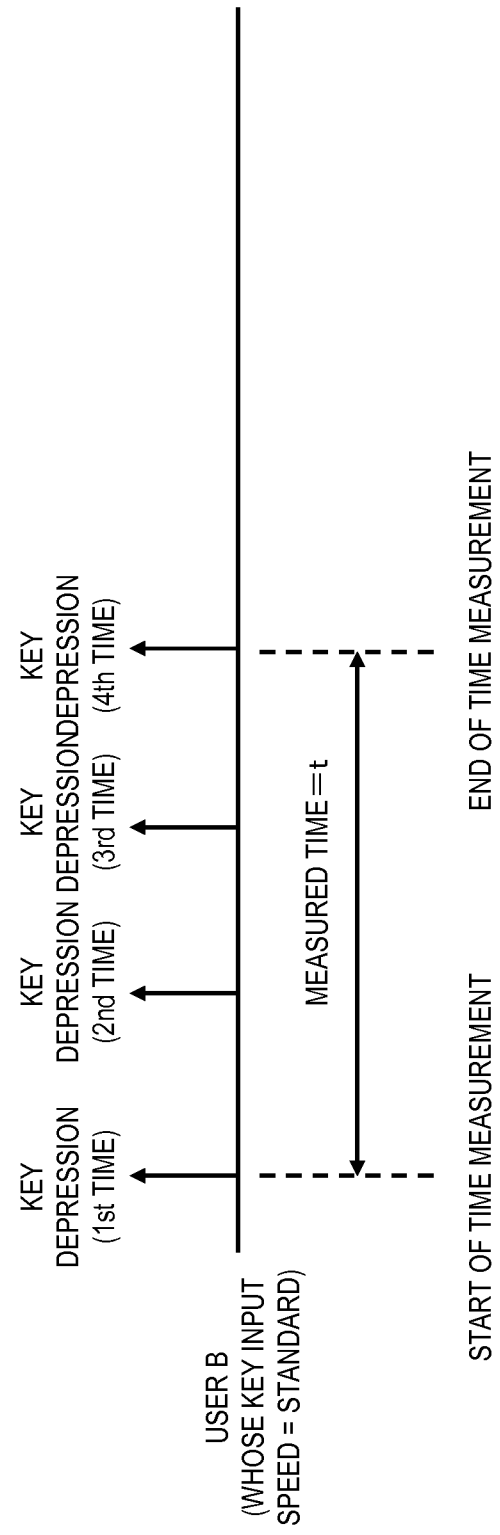
FIG. 5 is another diagram for explaining a process of estimating a skill according to the key input speed (when the key input speed is standard)
Figure 6:
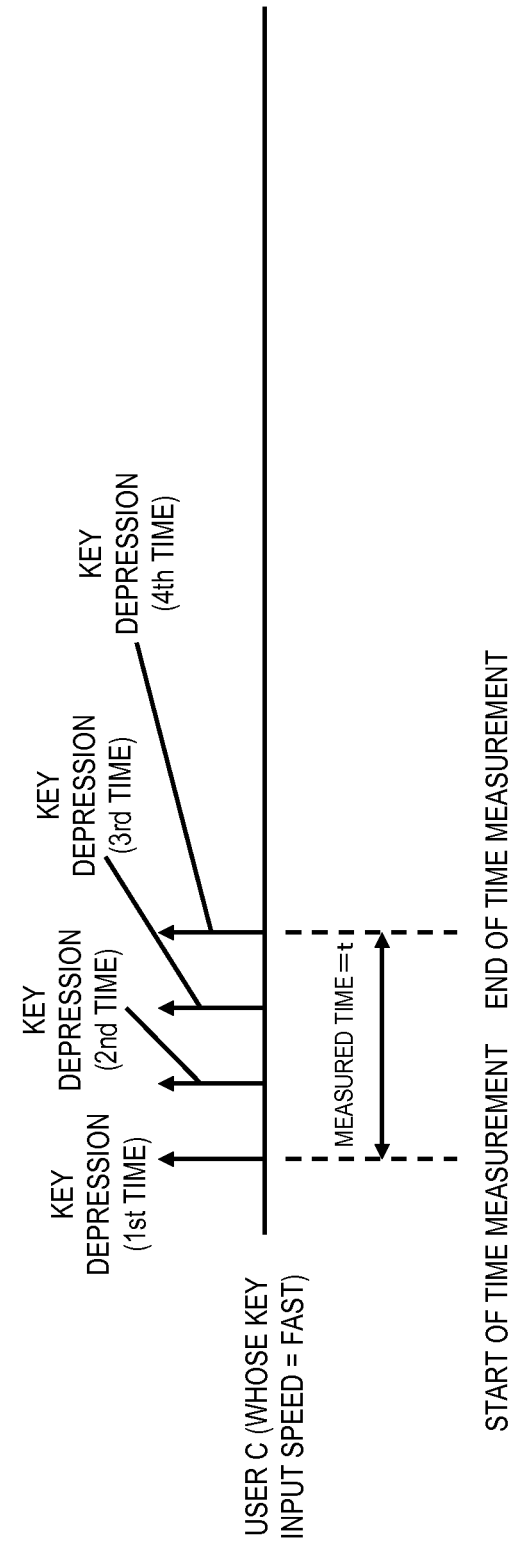
FIG. 6 is another diagram for explaining a process of estimating a skill according to the key input speed (when the key input speed is fast)

After the skill estimation start condition has been established, the control unit 30 causes the skill estimating timer 60 to operate, thereby starting measurement of the measured time t, as shown in FIGS. 4 to 6. Then, the control unit 30 causes the skill estimating counter 50 to be incremented whenever the key input signal c is supplied to the control unit 30. When the key is depressed four times, the value of the skill estimating counter 50 assumes the same value as the measurement count setting value n (=3), which is notified to the control unit 30.

The control unit 30 that has received the notification from the skill estimating counter 50 stops the skill estimating timer 60 that has been activated earlier than the skill estimating counter 60 to read the value of the timer. The control unit computes t/n from the value (measured time t) read from the skill estimating timer 60 and the measurement count setting value n set in the measurement count setting value storage unit 15, thereby computing the average input time k.

FIG. 4 is a diagram showing the measured time t for a user whose key input speed is slow, FIG. 5 is a diagram showing the measured time t for a user whose key input speed is standard, and FIG. 6 is a diagram showing the measured time t for a user whose key input speed is fast. As described above, the measurement count setting value n is three. Thus, the average key input time k for each of the users in FIGS. 4 to 6 is computed to be t/3.

When the average key input time k for the user in FIG. 4 is equal to or larger than the low-speed side threshold value SH_L, the determination period $T_{long}$ is set, according to the table in FIG. 3. When the average key input time k for the user in FIG. 5 is less than the low-speed side threshold value SH_L and more than the high-speed side threshold value SH_H, the determination period $T_{std}$ is set, according to the table in FIG. 3. Similarly, when the average key input time k for the user in FIG. 6 is equal to or less than the high-speed side threshold value SH_H, the determination period $T_{short}$ is set, according to the table in FIG. 3.

Figure 7:
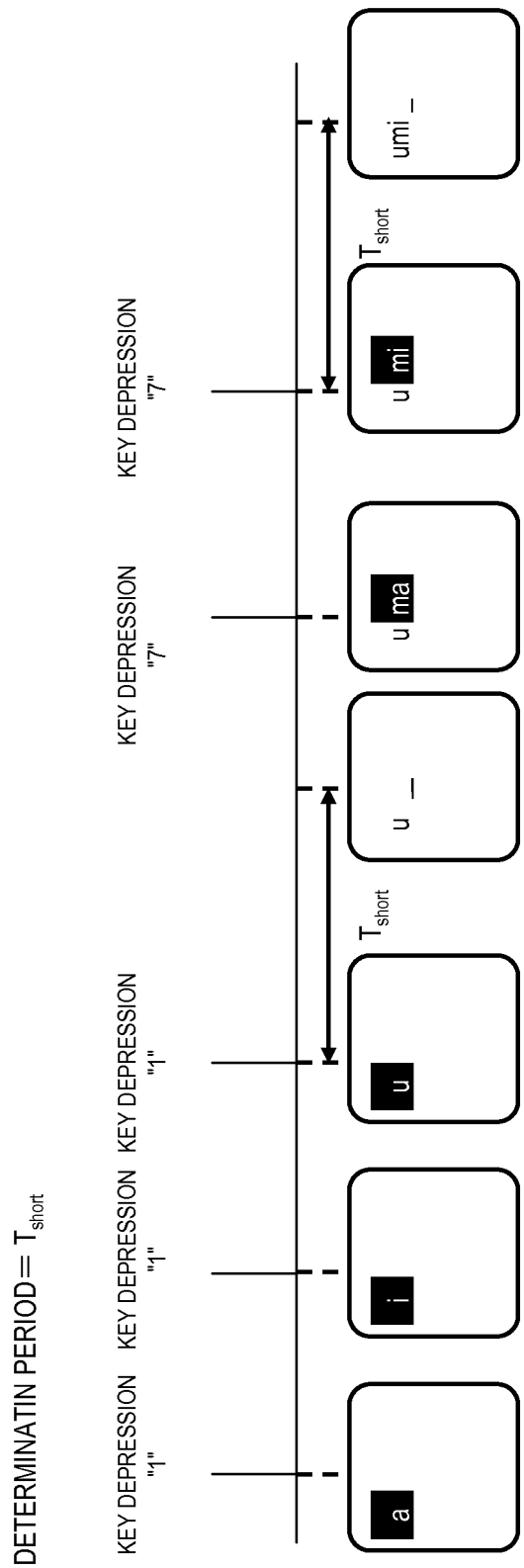
FIG. 7 is a diagram for explaining an operation of the character input device in the first exemplary embodiment of the present disclosure (when the skill of a user is high)

FIG. 7 is a diagram showing key operations and transition of the screen when the user in FIG. 6 inputs a Japanese word "umi" (Japanese Hiragana syllable letters). It is assumed that, in the example in FIG. 7, the determination period $T_{short}$ is set. When the user first depresses a "1" key assigned to the "a" column of the kana syllabary, the control unit 30 causes the first character "a" assigned to the "1" key to be displayed, and activates the no-input period measuring timer 20.

Subsequently, when the user depresses the "1" key, the control unit 30 causes the subsequent character "i" assigned to the "1" key to be displayed. Herein, the key input occurs before the value of the no-input period measuring timer 20 reaches the determination period $T_{short}$. Thus, a determination process using the first character "a" is not performed. The value of the no-input period measuring timer 20 is reset, and the no-input period measuring timer 20 is reactivated.

When the user further depresses the "1" key, the control unit 30 causes the subsequent character "u" assigned to the "1" key to be displayed. Herein also, the key input occurs before the value of the no-input period measuring timer 20 reaches the determination period $T_{short}$. Thus, a determination process using the character "i" is not performed. The value of the no-input period measuring timer 20 is reset, and the no-input period measuring timer 20 is reactivated.

Since the desired character "u" has been displayed, the user temporarily interrupts the operation of key input. When the value of the no-input period measuring timer 20 exceeds the determination period $T_{short}$, the control unit 30 judges that the determination operation of the character "u" has been performed, and causes the cursor to move to an adjacent position.

When the user who has confirmed that the character "u" was determined and then the cursor was moved next depresses a "7" key assigned to the "ma" column of the kana syllabary, the control unit 30 causes the first character "ma" assigned to the "7" key to be displayed. The control unit 30 also resets and reactivates the no-input period measuring timer 20.

Since the character "ma" is not a desired character, the user depresses the "7" key again. Then, the control unit 30 causes a character "mi" which is the subsequent character assigned to the "7" key to be displayed. Herein also, the key input occurs before the value of the no-input period measuring timer 20 reaches the determination period $T_{short}$. Thus, a determination process using the character "ma" is not performed. The value of the no-input period measuring timer 20 is reset, and the no-input period measuring timer 20 is reactivated.

Since the desired character "mi" has been displayed, the user temporarily interrupts the operation of key input. When the value of the no-input period measuring timer 20 exceeds the determination period $T_{short}$, the control unit 30 judges that the determination operation of the character "mi" has been performed, and causes the cursor to move to an adjacent position.

Figure 8:
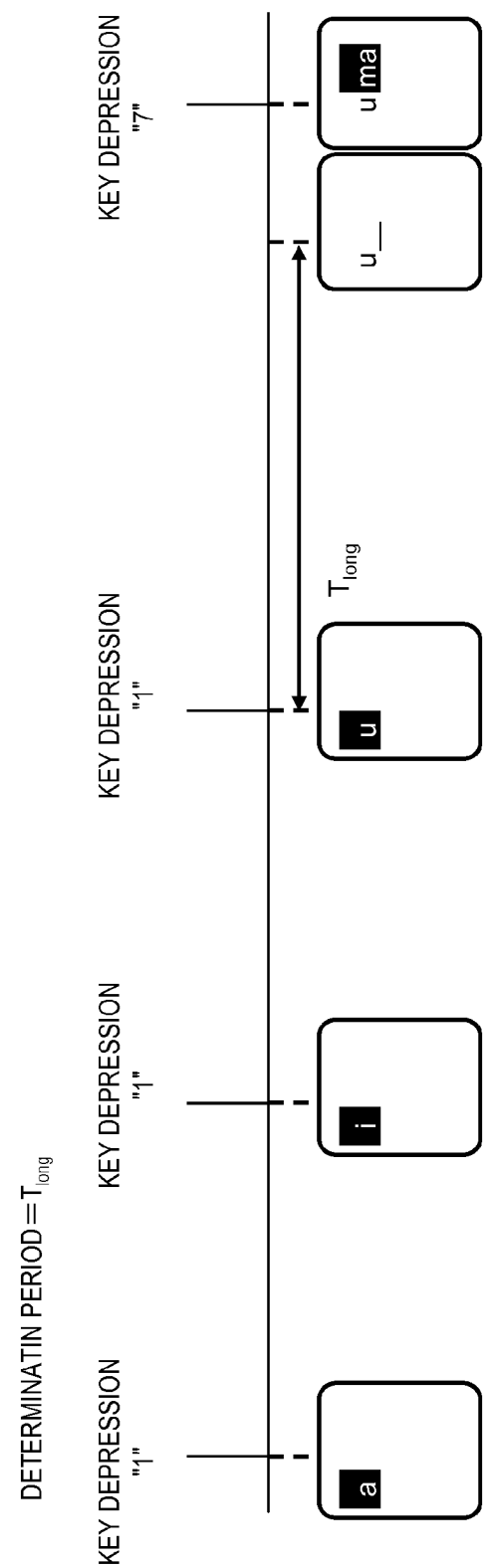
FIG. 8 is a diagram for explaining an operation of the character input device in the first exemplary embodiment of the present disclosure (when the skill of a user is low)

FIG. 8 is a diagram showing key operations and transition of the screen when the user in FIG. 4 inputs the Japanese word "umi". In the example in FIG. 8, it is assumed that the determination period $T_{long}$ which is longer than the determination period $T_{short}$ is set.

FIG. 8 is different from FIG. 7 in that each interval between the key operations by the user is longer than that in FIG. 8. However, the determination period $T_{long}$ which is longer than the determination period $T_{short}$ is set, as the determination period. Thus, even if second and third depressions of the "1" key are slow, the control unit 30 does not execute the determination process. Then, the user who has visually recognized the desired character "u" interrupts the operation of key input for a longer period of time than the determination period $T_{long}$. The determination process is thereby executed.

As described above, according to this exemplary embodiment, the determination period is increased or decreased according to the skill of a user. Thus, the determination process of an unintended character as shown in FIG. 10 is not performed even for the user whose key input speed is low.

Further, according to this exemplary embodiment, the shorter determination period can automatically be set for the user who is quick in key input. Thus, even the user who is quick in the key input can perform input operation without feeling stressed.

The above description was directed to the preferred exemplary embodiment of the present disclosure. The present disclosure is not limited to the above-mentioned exemplary embodiment, and can be further varied, replaced, and adjusted without departing from the basic technical concept of the present disclosure.

In the above-mentioned exemplary embodiment, for example, the description was given, assuming that the determination period itself is to be changed. The determination period may be of course corrected according to the average key input time k, as illustrated in FIG. 9 (showing a second exemplary embodiment). This exemplary embodiment can be suitably applied to a cellular phone in which a user can selectively switch the determination period to be (OFF/slow/standard/fast) using a menu. When the average key input time for the user who has selected the determination period to be "fast" is long, for example, correction of increasing the determination period by +α can be performed so that the determination period is increased.

In the above-mentioned exemplary embodiment, the average key input time k is obtained and is then compared with each of the threshold values to determine the determination period. A method of comparing a threshold value defined separately with a period of time needed for the predetermined number of times of key operations or input of the predetermined number of characters (refer to the measured period t in FIGS. 4 and 6) instead of the average key input time k can also be employed. With respect to the threshold values as well, determination using one of the high-speed side threshold value SH_H and the low-speed side threshold value SH_L may be made, for simplification. Alternatively, each of the high-speed side threshold value SH_H and the low-speed side threshold value SH_L may be further subdivided, the skill of a user in character input operation may be more finely estimated, and the determination period may be finely adjusted.

In the above-mentioned exemplary embodiment, the average key input time k is obtained and is then compared with each of the threshold values to determine the determination period. A method of estimating the skill of a user in character input operation according to the number of times of correction key depressions during a predetermined monitor period can also be employed. It is because, like the average key input time, the number of times of correction key depressions during dial transmission or input of a sentence by the user has a strong correlation with the skill of the user in the character input operation.

In the above-mentioned exemplary embodiment, the description was given, assuming that the average key input time k and the measured time t are obtained based on the measurement count setting value n of three set in the measurement count setting value storage unit 15 when the user performs dial transmission. The measurement count setting value n can be arbitrarily changed. A key operation other than the dial transmission may be of course used as a trigger for starting estimation of the skill of the user in character input operation.

In the above-mentioned description, description about a timing for changing the determination period after estimation of the skill was omitted. However, depending on the condition for starting the estimation of the skill in character input operation, the determination period may be frequently changed. The user may be thereby bewildered. In order to avoid this situation, the result of estimation of the skill of the user in the character input operation may be held for a predetermined period, and the determination period may be changed at a predetermined timing such as at a certain time interval or at a beginning of each month.

The exemplary embodiment may be modified or adjusted within the scope of the entire disclosure of the present invention, inclusive of claims, based on the fundamental technical concept of the invention. Further, variegated combinations or selection of elements disclosed herein may be made within the context of the claims. That is, the present invention may encompass various modifications or corrections that may occur to those skilled in the art within the gamut of the entire disclosure of the present invention, inclusive of claim and the technical concept of the invention. Particularly, any numerical range disclosed herein should be interpreted that any intermediate values or subranges falling within the disclosed range are also concretely disclosed even without specific recital thereof.

What is claimed is:

1. A character input device comprising:
    a skill estimation unit that estimates a skill of a user in character input operation, based on a history of key operation by the user;
    a character input interface unit that selects an input character based on a number of times at which a same key has been depressed;
    a determination period storage unit that stores an original determination period, selected by the user, for determining the character being selected; and
    a control unit that increases or decreases the determination period according to the skill estimated by the skill estimation unit, wherein during the determination period the character input interface unit judges whether or not a determination operation of the character has been performed;
    wherein the determination period may be adjusted by the user via a menu; and
    the determination period may be adjusted by the user in a stepwise fashion.

2. The character input device according to claim 1, wherein when the skill estimated by the skill estimation unit is low, the determination period is increased.

3. The character input device according to claim 2, wherein the skill estimation unit estimates the skill of the user in the character input operation, based on a period of time needed for a predetermined key operation or a period of time needed for inputting a predetermined number of characters.

4. The character input device according to claim 3, wherein the skill estimation unit estimates the skill of the user in the character input operation when the user performs dial transmission.

5. The character input device according to claim 4, wherein an estimation result of the skill of the user in the character input operation by the skill estimation unit is held for a predetermined period; and
the determination period is changed at a predetermined timing.

6. The character input device according to claim 3, wherein an estimation result of the skill of the user in the character input operation by the skill estimation unit is held for a predetermined period; and
the determination period is changed at a predetermined timing.

7. The character input device according to claim 2, wherein the skill estimation unit estimates the skill of the user in the character input operation when the user performs dial transmission.

8. The character input device according to claim 7, wherein an estimation result of the skill of the user in the character input operation by the skill estimation unit is held for a predetermined period; and
the determination period is changed at a predetermined timing.

9. The character input device according to claim 2, wherein an estimation result of the skill of the user in the character input operation by the skill estimation unit is held for a predetermined period; and
the determination period is changed at a predetermined timing.

10. The character input device according to claim 2, wherein
the skill estimation unit estimates the skill of the user in the character input operation, based on a number of times of correction key depressions during a predetermined monitor period.

11. The character input device according to claim 1, wherein
the skill estimation unit estimates the skill of the user in the character input operation, based on a period of time needed for a predetermined key operation or a period of time needed for inputting a predetermined number of characters.

12. The character input device according to claim 11, wherein
the skill estimation unit estimates the skill of the user in the character input operation when the user performs dial transmission.

13. The character input device according to claim 12, wherein
an estimation result of the skill of the user in the character input operation by the skill estimation unit is held for a predetermined period; and
the determination period is changed at a predetermined timing.

14. The character input device according to claim 11, wherein
an estimation result of the skill of the user in the character input operation by the skill estimation unit is held for a predetermined period; and
the determination period is changed at a predetermined timing.

15. The character input device according to claim 1, wherein
the skill estimation unit estimates the skill of the user in the character input operation when the user performs dial transmission.

16. The character input device according to claim 15, wherein
an estimation result of the skill of the user in the character input operation by the skill estimation unit is held for a predetermined period; and
the determination period is changed at a predetermined timing.

17. The character input device according to claim 1, wherein
an estimation result of the skill of the user in the character input operation by the skill estimation unit is held for a predetermined period; and
the determination period is changed at a predetermined timing.

18. The character input device according to claim 1, wherein
the skill estimation unit estimates the skill of the user in the character input operation, based on a number of times of correction key depressions during a predetermined monitor period.

19. A character input interface control method comprising:
estimating a skill of a user in character input operation by a skill estimation unit, based on a history of key operation by the user;
storing an original determination period, selected by the user, for determining the character being selected by a character input interface unit; and increasing or decreasing the determination period according to the skill estimated by the skill estimation unit,
wherein during the determination period the character input interface unit selects the character based on a number of times at which a same key has been depressed and judges whether or not a determination operation of the character has been performed, based on the determination period;
the determination period may be adjusted by the user via a menu; and
the determination period may be adjusted by the user in a stepwise fashion.

20. The character input interface control method according to claim 19, comprising:
increasing the determination period when the skill estimated by the skill estimation unit is low.

* * * * *